Patented July 29, 1941

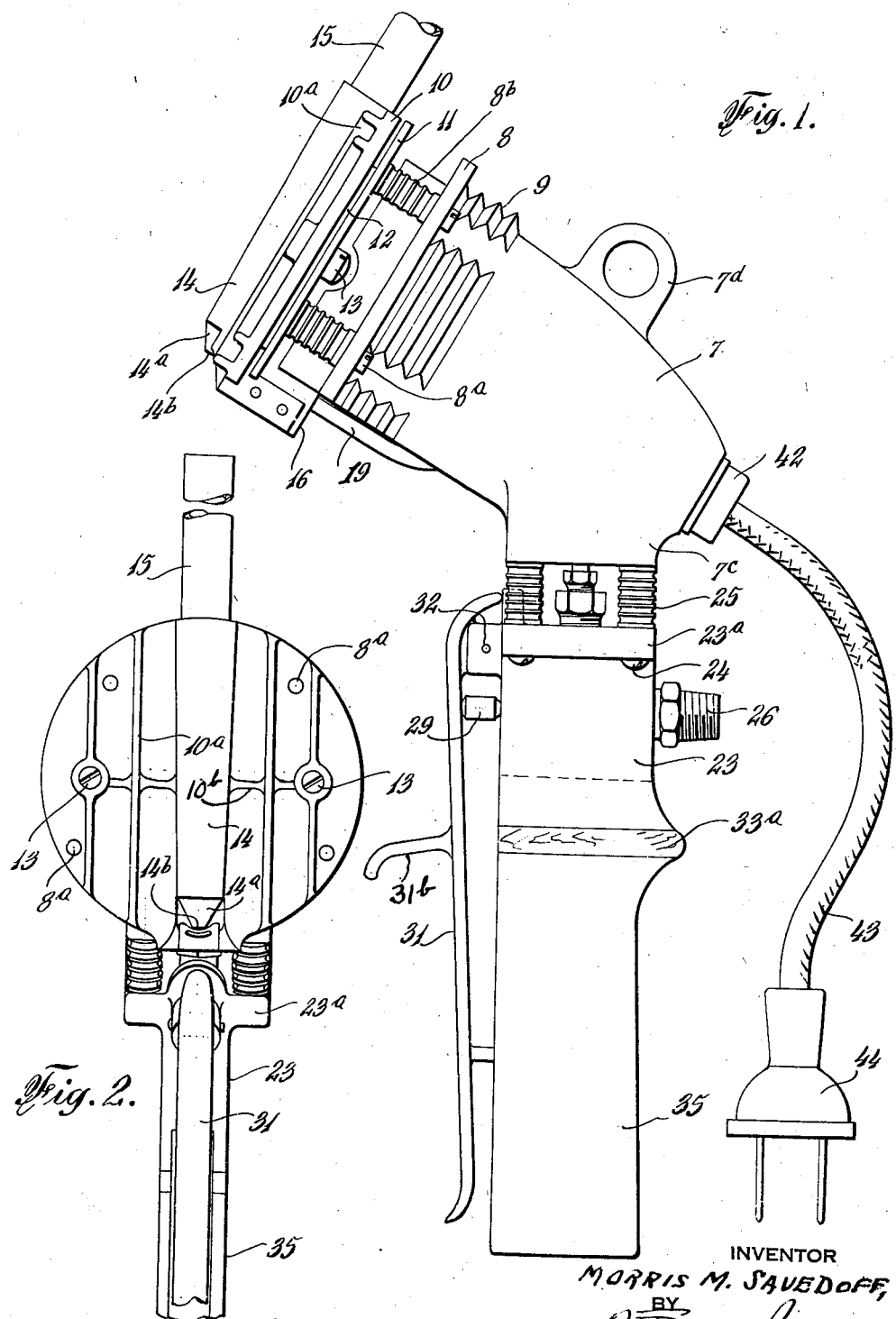

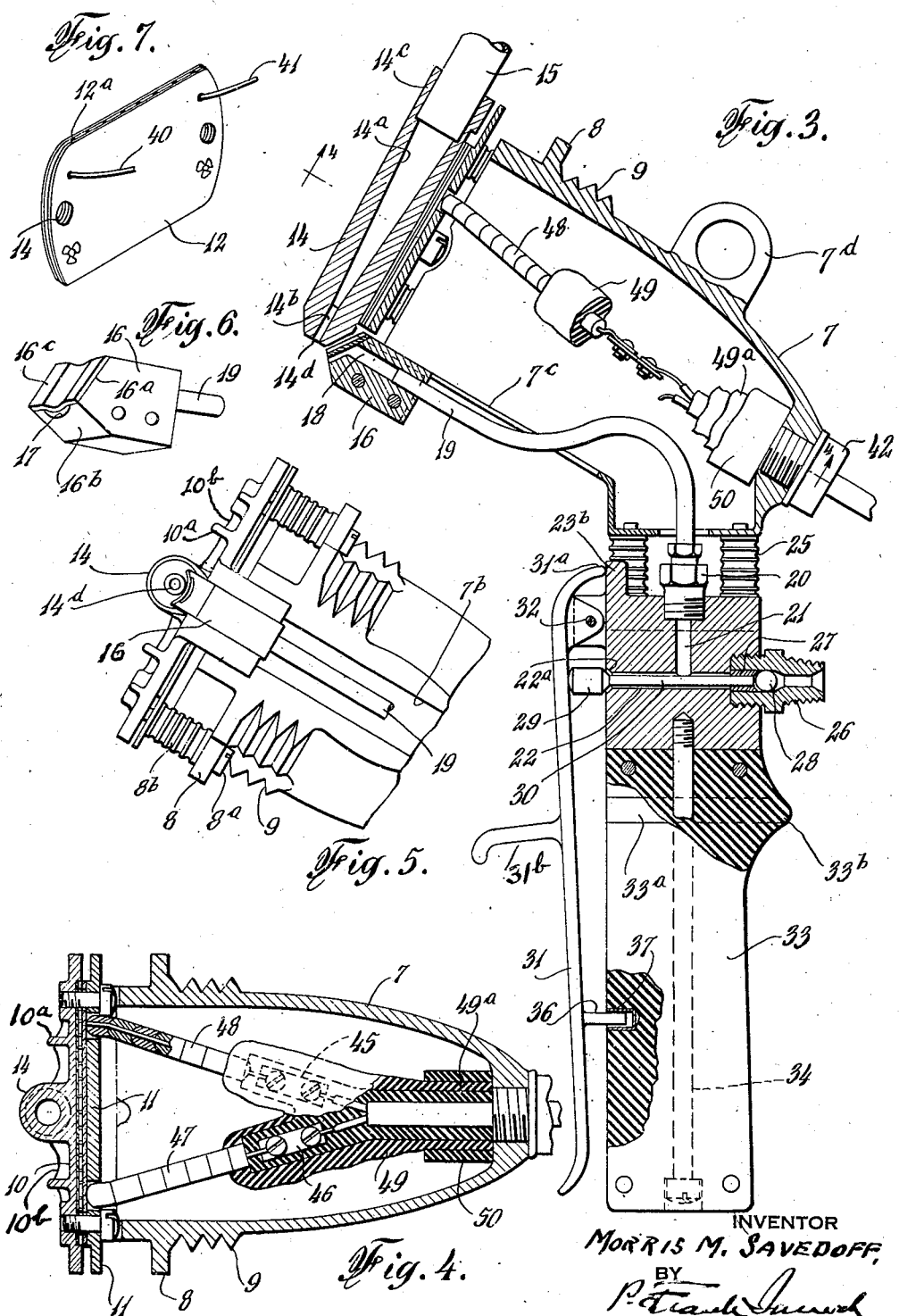

2,250,783

UNITED STATES PATENT OFFICE 2,250,783

SPRAYING APPARATUS

Morris M. Savedoff, Brooklyn, N. Y.

Application November 29, 1939, Serial No. 306,591

2 Claims. (Cl. 91—12.2)

This invention relates generally to spraying apparatus and is more particularly directed to improvements in so-called spray guns, especially of those types which are employed for spraying molten metal or metallic alloys, in the treatment of metallic surfaces for various purposes.

While my invention, as will become manifest, is susceptible of a wide range of application, for the purposes of this disclosure, I have elected to present it as it may be utilized in spraying solder, to which it is especially applicable. However, this is merely illustrative and is not to be construed in any sense as a limitation of the scope of utility of my invention, since it may be equally advantageously used in operating with other molten alloys and metals, not only in effecting resurfacing operations, but in building up surfaces and creating designs in intaglio and relief.

As is well known, solder is employed in filling and building up indented metallic surfaces to permit of their restoration to their original unmarred appearance, as in removing collision marks in motor vehicle bodies, fenders and the like. The solder is applied either by hand in the conventional way, or by spraying it from a gun. The hand method is not only a laborious and costly operation but can only be satisfactorily performed by skilled artisans. While the gun spraying process was evolved to reduce the high costs and obviate other disadvantages of the hand methods, the apparatus available for doing the work do not possess those characteristics which it has been found, are essential to its performance in an efficient and economical manner, as is requisite for commercial purposes. For instance, as pointed out in my co-pending application for Letters Patent, Serial No. 130,475, filed March 12, 1937, of which this application is a continuation in part, prior to my invention, it was necessary for the operator to employ both hands in the use of the spraying apparatus, the gun being held in one, while the solder stick was supported in the melting chamber of the apparatus by the other. This, obviously, is awkward for the operator, with the result that he frequently relaxes his hold on the solder stick, which either drops out of the gun or tilts at an angle therein to admit air to the melting chamber, causing the solder to solidify and producing an interruption in the work while the chamber is cleared of the accumulation, with a consequent waste of time and material. Further, because of the manner in which the solder is fed to the melting chamber and the inefficiency in the functioning of the air nozzle, incomplete atomization frequently results and the solder fails to adhere to the surface under treatment or forms a so-called blotch thereon, which must be removed before the work may proceed; also, the operator is unable to accurately direct the molten alloy spray when the conditions of use make it necessary to hold the gun at certain angles to the vertical, entailing extra labor and expense in the removal of the surplus deposit, aside from the waste of time and material.

While the invention of my aforesaid application overcomes many of the disadvantages of apparatus available prior thereto, I have recognized that in order to obtain greater efficiency and economy in the practicing of metal spraying processes generally and especially as employed in the restoration of indented surfaces to their original contour, higher operating temperatures and faster initial heating of the apparatus, were essential, together with lower operating costs and a greater range of adaptability to the requirements of unskilled labor.

Therefore, the primary object of this invention is to provide a more practical, highly efficient and economical method and means of spraying molten solder or lead, than is now existent, as utilized in the building up of metallic surfaces generally, as well as other molten metals or metallic alloys, for whatever purposes they be desired or applied.

It is a further object of this invention to provide a metal spraying apparatus of a simple and durable construction, by means of which a piece of work may be executed by the unskilled, without waste of material and with the facility and precision that is difficult of attainment by skilled artisans, using existing types of apparatus.

More specifically, it is the object of this invention to provide a metal spraying apparatus or gun, which will heat faster initially and operate at higher temperatures than any prior apparatus, thereby reducing the time necessary to institute operations and materially increasing the efficiency by obtaining a more complete atomization of the metal being sprayed, than is now possible, with a concomitant elimination of clogging of the melting chamber and the resultant interruption of the work.

Another object of this invention is to provide a metal spraying apparatus having the aforesaid characteristics, in which the heat is generated and concentrated in the zone of the chamber in which the metal is melted, which is isolated from the remainder of the gun, so that the high temperatures under which the gun functions are not communicated to the apparatus beyond the melting chamber zone and do not interfere with the handling thereof, or detrimentally affect the structure itself, as would be the case if it were attempted to employ equivalent temperatures in spraying apparatus as now constructed.

My invention further comprehends a metal spraying apparatus as aforesaid, embodying a more efficient form of air nozzle which is so associated with the melting chamber outlet that the direction or placement of the spray may be accurately controlled by the operator, irrespective of the angle at which the apparatus may be held relatively to the work, the nozzle also contributing materially to improved atomization of the molten metal.

A further and important object of this invention is the elimination of possible so-called blotching which occurs in the use of the gun, when the emission of air from the nozzle is non-continuous or intermittent, my apparatus including an air control system in which means are incorporated for insuring a continuous emission of air from the nozzle while the gun is held in operating position in the hand.

Another object of my invention is to facilitate execution of the work by providing means for supporting the solder stick in the melting chamber of the apparatus so that the latter may be conveniently manipulated with one hand, this supporting means insuring a positive and continuous feeding of the solder to the chamber outlet and eliminating premature chilling and solidification of the solder within the chamber, which occurs in the use of prior apparatus as heretofore pointed out.

Further important objectives of my invention are to increase the factor of safety in the use of spraying apparatus, add to its sphere of utility and provide for the ready conversion of the gun for operating with metals and alloys of various melting points.

Other objects and advantages flowing from the practicing of my invention will become manifest as the description proceeds, and I would have it understood that I reserve unto myself all rights to the full range of equivalents, both in structure and in avenues of use, to which I may be entitled under my invention in its broadest aspect.

In the accompanying drawings, I have shown a preferred embodiment of my invention. However, it may take other forms to meet requirements of production and use and in attaining the objectives to which it is directed, within the purview of the appended claims.

In the drawings:

Figure 1 is a side elevation of a spraying apparatus conforming to my invention.

Figure 2 is a front elevation of the structure of the preceding figure.

Figure 3 is a sectional elevation of the apparatus.

Figure 4 is a longitudinal section of the barrel on the line 4—4 of Figure 3.

Figure 5 is a bottom plan view of the forward portion of the barrel of the apparatus.

Figure 6 is a perspective of the air nozzle of the apparatus, and

Figure 7 is a view in perspective of the heating unit located at the head end of the barrel.

Referring now to the drawings in detail, in which like characters of reference are employed to designate similar parts in the several views, 7 indicates the body or barrel of the apparatus or so-called spray gun which may be cast of aluminum or other suitable metal, in the configuration, and embodies a peripheral flange 8 and associated circumferential ribs 9 adjacent its larger end, the flange serving as a mounting for the components of the head assembly. This assembly includes a pair of annular plates 10 and 11, preferably of ferrous metal, between which is interposed the heating unit 12, the plate 10 being ribbed, as at 10a and apertured to receive the screws 13 which pass through the openings 14 in the heating unit for threaded engagement with complemental holes in the under plate 11, the interconnected plates being secured to said flange 8 in spaced relation to the end of the barrel by the screws 8a and the cooperating ribbed sleeves 8b.

As will be observed, the head plate 10 is formed, as at 14, to provide a so-called melting chamber 14a of a conical shape which, at its upper end, merges into a cylindrical portion 14c, preferably tapped to receive the complementally threaded tube 15. This tube is adapted to function as a support and guide for a stick of solder or the like inserted in the melting chamber, making it unnecessary for the operator to hold the stick in the chamber, as in prior devices. Also, by thus supporting the stick, contact between the lower end thereof and the surrounding wall of the melting chamber is continuously maintained, irrespective of the angle at which the gun may be held in use, so that air cannot pass by the stick to the lower end of the chamber and prematurely chill the molten metal and cause clogging of the outlet. The lower end of the chamber 14a merges into a small diameter cylindrical passage 14b, opening to the atmosphere at 14d, in proximity to the outlet of the air nozzle 16.

The aforesaid air nozzle is of a block-like form, the head end thereof being composed of oppositely disposed chamfered surfaces 16a and 16b, with the discharge outlet 17, which is an arcuate slot-like orifice, located in the lower angularly disposed surface 16b, the outlet communicating with the nozzle bore 18 in which one end of the air supply tubing 19 is entered. The nozzle is mounted on the plate 10, which embodies a pair of integrally formed lugs 10a, between which the nozzle-forming block is positioned and to which it is pinned or otherwise secured, the nozzle outlet being below the plane of the melting chamber outlet 14d and on a line inclined downwardly at an angle of approximately 45° to the longitudinal axis of the melting chamber.

The melting chamber, while preferably integral with the plate 10, as shown, may be separately formed and fixed thereto by any suitable means; also, the plates 10 and 11 may take other shapes and other methods may be utilized for connecting the head assembly to the barrel 7. Also, in the formation of the nozzle outlet 17, any practical method may be followed, in the present showing, the upper inclined surface 16a of the head-end of the nozzle block being undercut to form the base of the arcuate orifice, a plate 16c appropriately conformed to define the top of the lunate orifice being associated with the surface 16a and welded thereto.

A so-called composite stock or grip includes an upper all-metal section 23, which embodies a flange 23a and a lower section 33 formed of wood or other non-metallic material, embodying laterally projecting surfaces or shoulders 33a, the extensions 33b of said lower section above said shoulders being entered in the lower slotted end of the upper stock section and the two sections interlockingly connected by the bolt 34 countersunk in the base of the lower section and threaded into that of the upper one, as clearly shown in Figure 3. Suitable facing plates 35, of metal, formed to meet and lie flush with said shoulders 33a, are superimposed upon the sides of the non-metallic section of the stock and secured thereto by screws or the like.

As will be apparent, the flange 23a of the upper section 23 of the stock is apertured for the reception of the screws 24 which are adapted to be threaded into the base of the shouldered portion 7c of the barrel 7 for connecting the stock assembly thereto, the latter being spaced from the barrel by the interposed ribbed sleeves 25 embracing said screws. This spacing of the stock from the barrel and the composite construction of the stock insures convenient handling of the apparatus and efficient operation, since the handle or stock remains cool under constant use, irrespective of the temperatures at which the gun may be functioning.

It will be noted that the aforesaid tube 19, connected to the nozzle 16, enters the barrel 7 through the slot 7b and is coupled to the nipple 20 threaded into the top of the stock section 23, in communication with the vertical passage 21 which, in turn, communicates with the horizontal passage 22, also in said stock section 23. At one end, this passage 22 communicates with the fitting 26 which embodies a valve chamber formed with a valve seat 27 to receive the ball valve 28, confined within said chamber, the outer end of said fitting being connectable to an air line leading from a tank, compressor or other source of supply. At its other end, the passage 22, which extends across the stock, is flared outwardly, as at 22a, to form a seat for the complemental surface of the head 29 of the rod 30, which is freely movable longitudinally of the passage, for controlling the seating and unseating of the valve 28.

A lever or trigger 31, pivotally mounted on the stock, as at 32, is formed to abut upon the head 29 of the rod 30, the manual actuation of the trigger toward the stock being effective to urge the rod inwardly to impinge against and unseat the valve 28 in opposition to the counter air pressure, to permit the air to flow past the valve and into the communicating passages for emission from the nozzle orifice 17, it being evident that as the valve is unseated, the inner end of the rod head will cooperate with the complemental surface 22a, at the end of the bore 22, to seal this extremity of the passage and prevent the exhaust of air except from the lunate orifice of the nozzle. When the pressure effective upon the trigger to open the valve is released, as at the conclusion of an operation, the valve 28 is instantly seated in response to the impinging air stream entering the fitting 26, it being obvious that the rod 30 is simultaneously urged outwardly with a concurrent rocking of the lever upon which the rod head abuts. Suitable stops are provided to limit the movement of the lever or trigger 31 in each direction, the offset upper end 31a thereof, being adapted to engage a lug 23b on the head of the stock section 23 to limit the movement of the trigger outwardly, while the pin 36 adjacent the lower end of the trigger, which is entered in a sleeve 37 countersunk in the stock section 33, limits the movement of the trigger in the reverse direction.

By mounting the lever or trigger as described and making it of a length approximating that of the stock, it will be evident that when the stock is grasped in the hand of the operator of the gun, the trigger must of necessity be actuated to open the valve for emission of air from the nozzle 16, the air being continuously emitted while the gun is being held in functioning position. Thus, constant emission of air from the nozzle and continuous atomization of the molten metal issuing from the melting chamber outlet is assured during the use of the gun, any possibility of so-called blotching, because of relaxation of pressure on the trigger, as may happen in the use of prior devices, being entirely eliminated.

The heating unit 12, mounted between the plates 10 and 11, may be of any standard construction, embodying the usual mica plates 12a between which the electrical element is located, the leads 40 and 41 of the latter being connected to a source of electrical energy through the medium of the two-wire cable 43, provided with the usual appliance plug 44. This cable enters the barrel 7 through an insulating bushing or collar 42, threaded into the rear end of the barrel, the respective wires being joined to the aforesaid element leads by the connectors 45 and 46 to which the wires are secured by the usual screws. To eliminate any possibility of short-circuiting within the barrel, the element leads are embraced by a series of insulating blocks or collars 47 and 48, between the unit and the aforesaid connectors, the wires and the cable being covered with a conforming plastic or pliable insulating material, which takes the form of a Y, the stem 49a of which is greater in diameter than the barrel opening through which the cable enters and is embraced by a collar 50. As will be apparent, the enlarged stem of the Y-shaped insulating material, together with the associated collar 50, prevents movement of the cable within the barrel in response to any pull which may be exerted thereon externally of said barrel, which, otherwise, might break the circuit at the connectors or elsewhere within the barrel, thereby not only increasing the factor of safety in the use of the apparatus, but adding to its durability.

From the structure described, it will be evident that I have provided a gun of an entirely practical design which will function at the high temperatures which it has long been recognized are essential to complete atomization and efficient and economical performance, but which were unattainable in the use of prior apparatus, because of their construction and the limitations imposed thereby in the use of the heating unit or element. All previous types of spraying apparatus have been of a unitary design, the heating element being incorporated in the barrel, with the melting chamber relatively so disposed that the heat losses were considerable. In fact, instead of the heat being concentrated in the area of the melting chamber, it was transmitted through the entire apparatus, the stock, in many instances, becoming heated to a degree that interfered with the handling of the gun. For this reason, and because of the fact that the apparatus were cast of aluminum to facilitate their handling, the critical point of which is 1200° F. it was necessary to limit the maximum temperature to approximately 650° F., in some cases a thermostat being employed for the purpose. This has resulted in slow initial heating and inefficient performance, the relatively low temperature at which the molten metal issues from the melting chamber dropping to a point, under the influence of the impinging cold air stream, which results in poor characteristics, the loose sandy-like mass lacking the essential adhesive properties.

With my apparatus, the head assembly, insulated from the remainder of the structure, and formed of ferrous metal, permits of the use of a heating element whereby operating temperatures in excess of 1000° F. may be safely employed, and without the slightest inconvenience to the operator or the possibility of detrimentally affecting the aluminum barrel or the metal of the stock. Furthermore, in my construction, the heat is concentrated at that point where it is required,— the melting chamber, the heat being transferred from the heating unit to the entire surrounding wall of the chamber to effect a more uniform melting of the metal supported therein, than is obtainable in prior devices.

A practical commercial gun conforming to my invention heats initially to a temperature of 1400° F. within a few minutes and an average operating temperature of approximately 1000° F. is maintained at all times while spraying. This high temperature liquefies the solder more uniformly, for the reason above pointed out, and a finer and hotter spray is obtained which, of course, adheres to the surface under treatment more uniformly and compactly than the spray that is produced by the existing low temperature apparatus. Another advantage of my construction is its adaptability to use with low grade solders or lead, whereas, with the low temperature apparatus a special solder is required. Of course, it may also successfully operate with other metals, having a higher melting point than solder, the requisite temperature being attained by the use of a heating element of the wattage necessary to produce it, which may be readily interposed between the head plates in the manner described, the gun being used in the ordinary manner.

While I have described my invention more or less specifically with reference to a specific form of use, as heretofore pointed out, it may be applied to other uses with equal advantages, economically and otherwise, it being obvious that the head assembly may take such forms as may be required for different types of metals and that the heating element may be of different electrical characteristics; also the barrel and stock may be otherwise constructed, while the form of valve mechanism for controlling the air stream may be varied to meet production or other requirements, in attaining the objectives of my invention as heretofore set forth and without departing from the spirit and scope thereof, as set forth in the following claims.

I claim:

1. A head assembly for a hand-operated metal spraying apparatus, including a pair of annular metal plates, a metal melting chamber, embodying an outlet formed integral with one of said plates, the outer surface of said plate being provided with cooling ribs, a heating unit interposed between said plates and an air nozzle carried by one of said plates, said nozzle having its outlet below and to the rear of the outlet from said melting chamber.

2. A head assembly for a hand-operated metal spraying apparatus, including a pair of annular metal plates, a metal melting chamber formed integral with one of said plates, said chamber having an outlet at its base, a heating unit interposed between said plates and an air nozzle carried by one of said plates, said nozzle having a lunate outlet for emitting air to propel the molten metal issuing from said chamber toward the work, said nozzle outlet being below and to the rear of the melting chamber outlet.

MORRIS M. SAVEDOFF.